Jan. 9, 1940.   O. JOHNSON   2,186,073
CONTAINER AND MEANS FOR AND METHOD OF MAKING CONTAINERS
Filed June 24, 1938   8 Sheets-Sheet 1
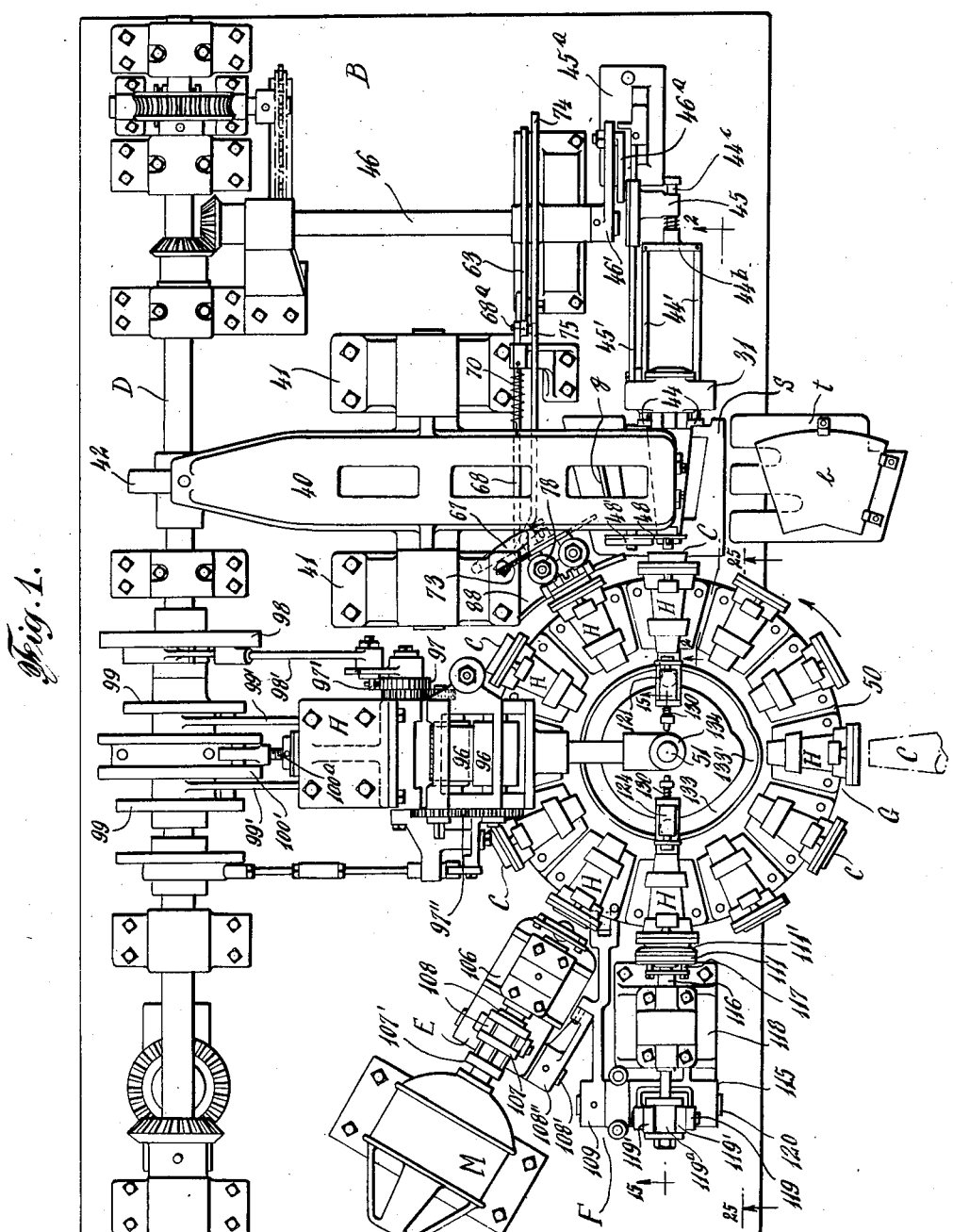
INVENTOR
Ogden Johnson
BY
ATTORNEY

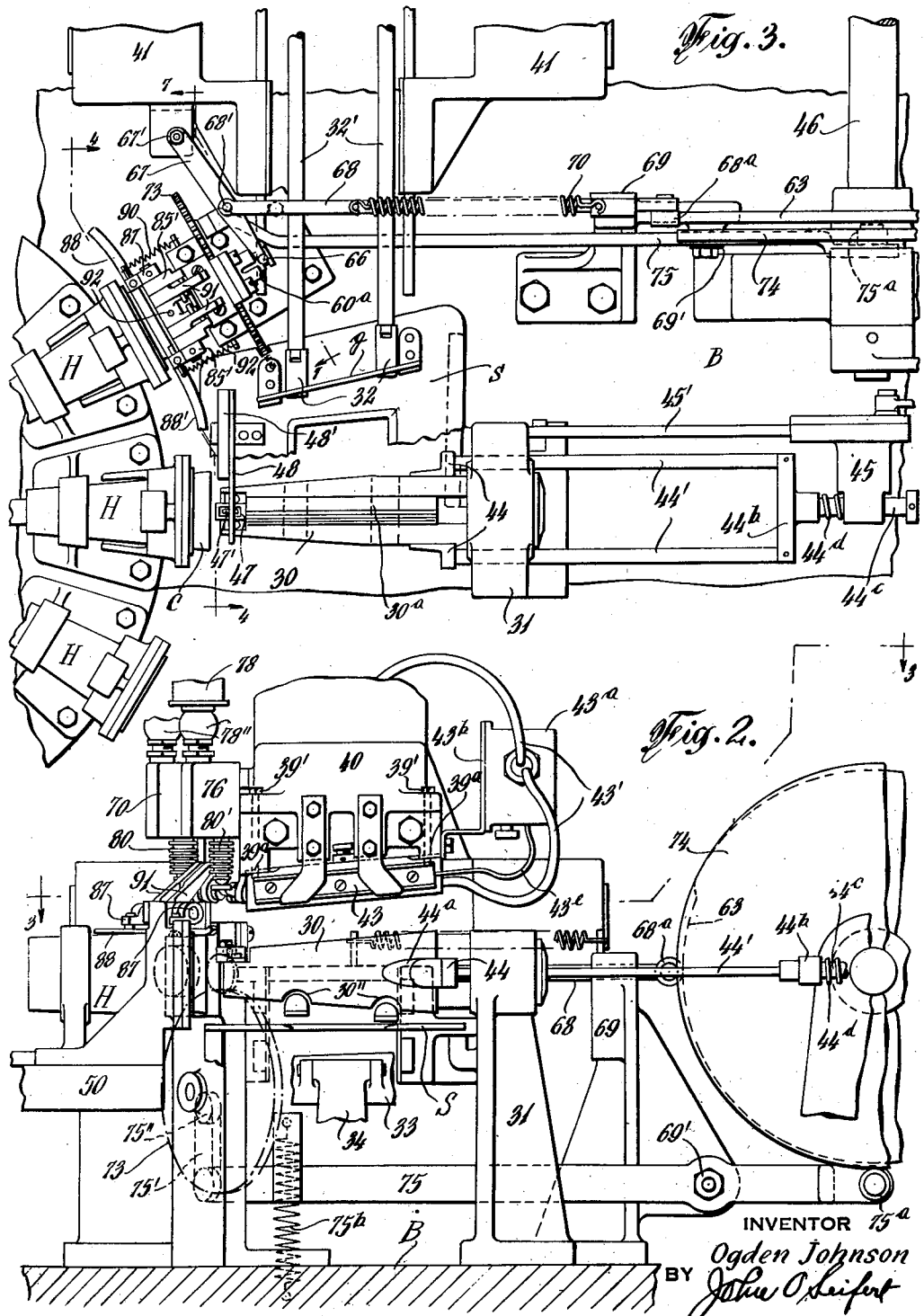

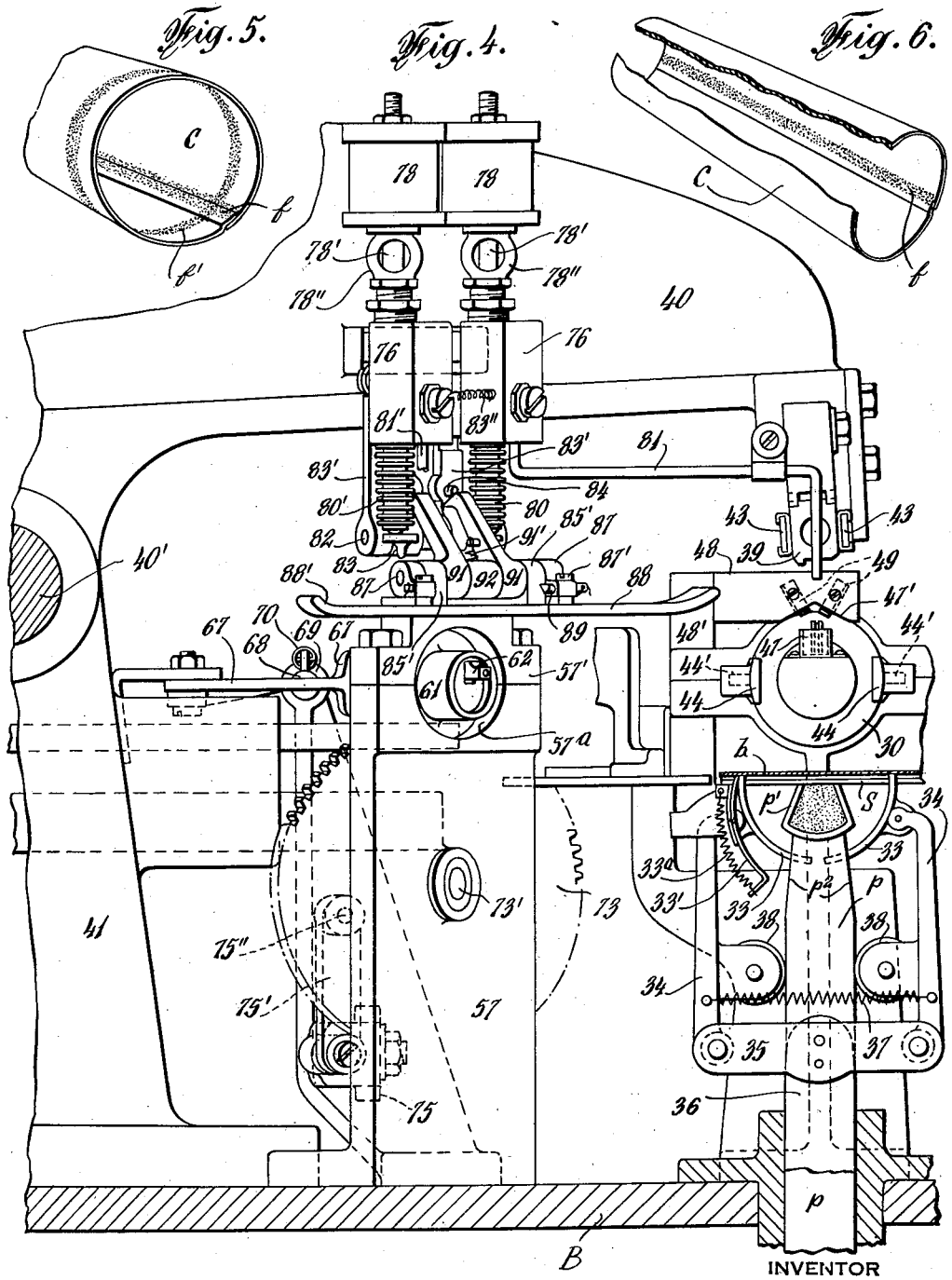

Jan. 9, 1940.  O. JOHNSON  2,186,073
CONTAINER AND MEANS FOR AND METHOD OF MAKING CONTAINERS
Filed June 24, 1938  8 Sheets-Sheet 4
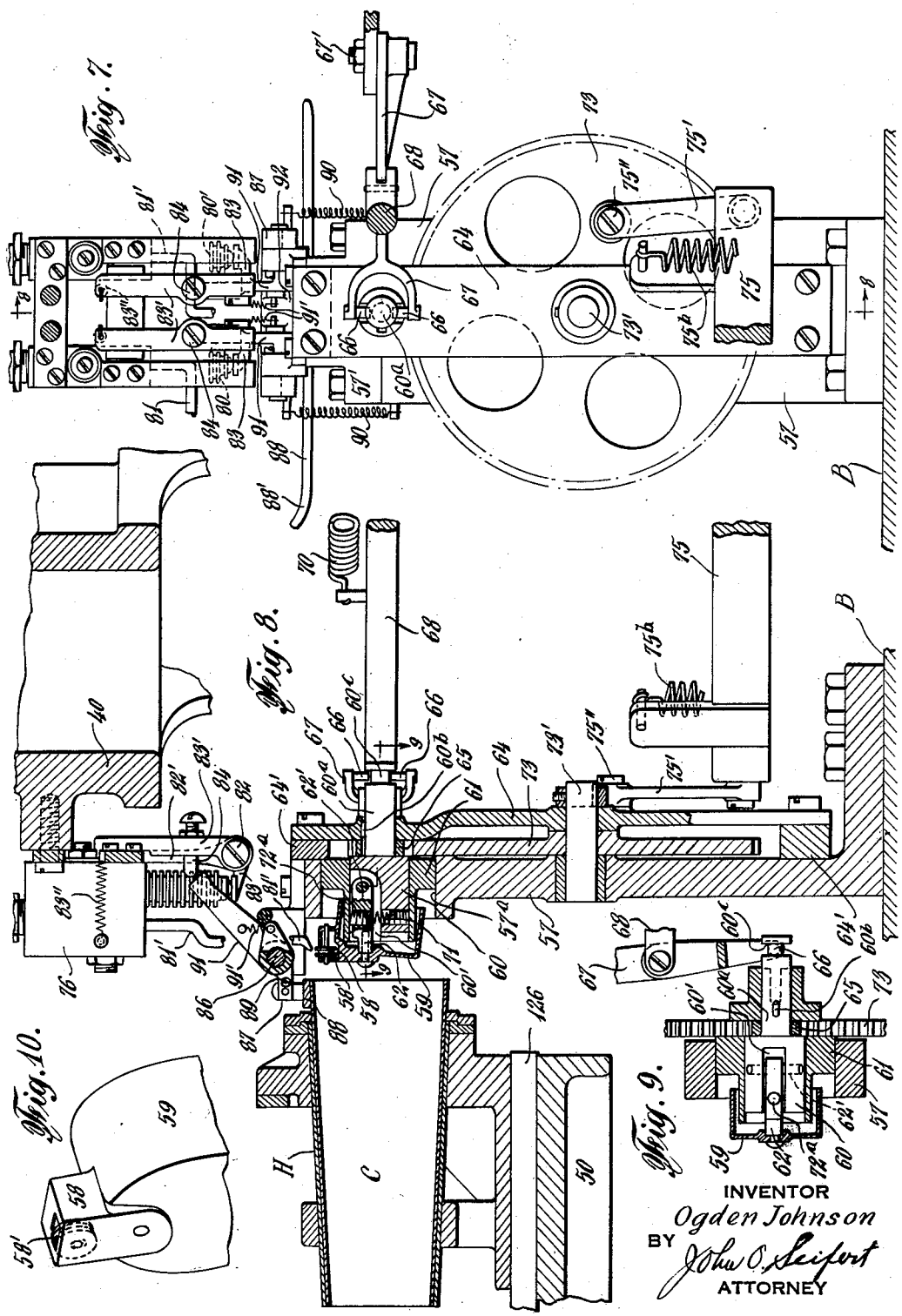
INVENTOR
Ogden Johnson
BY John O. Seifert
ATTORNEY

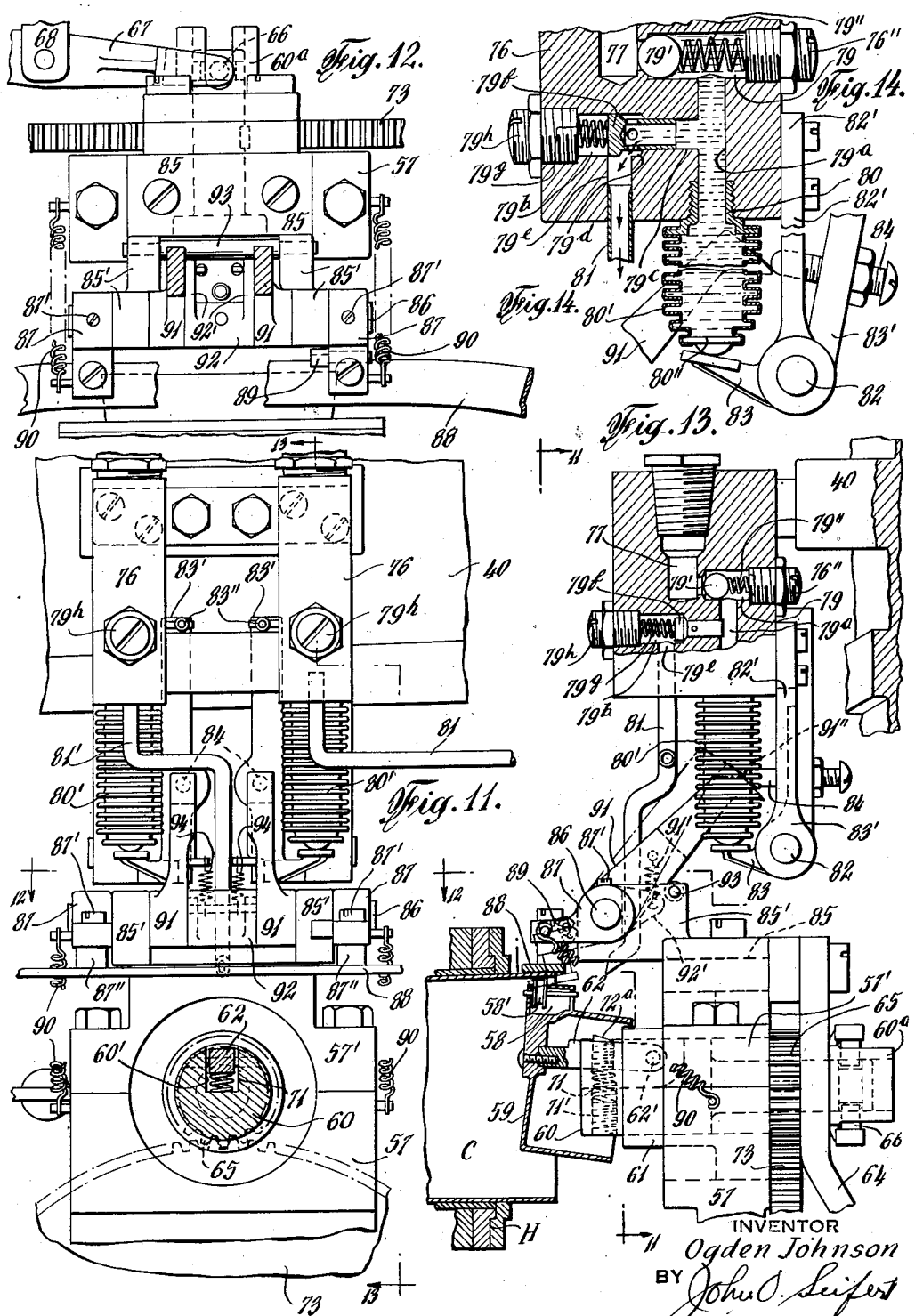

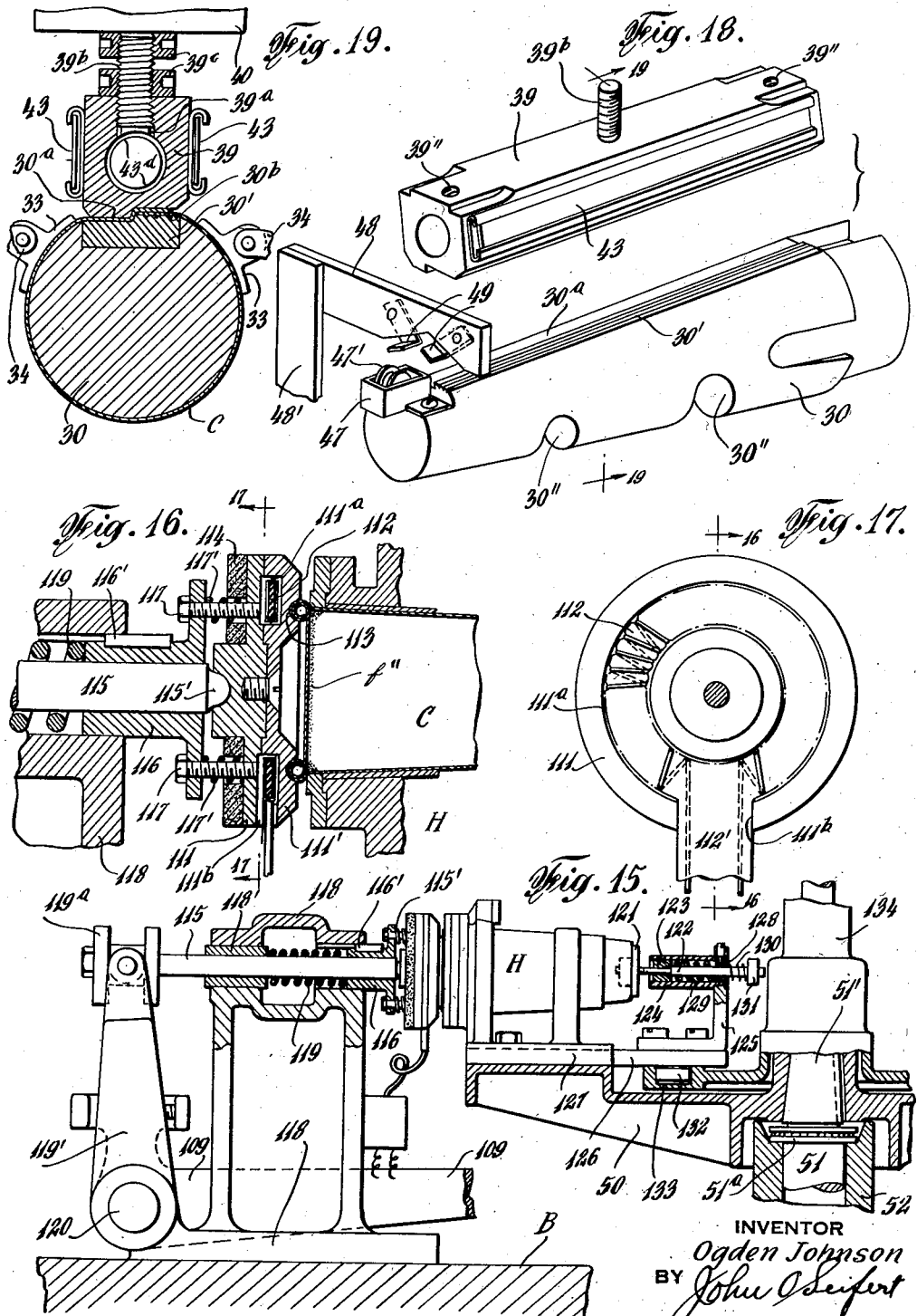

Jan. 9, 1940. O. JOHNSON 2,186,073
CONTAINER AND MEANS FOR AND METHOD OF MAKING CONTAINERS
Filed June 24, 1938 8 Sheets-Sheet 7
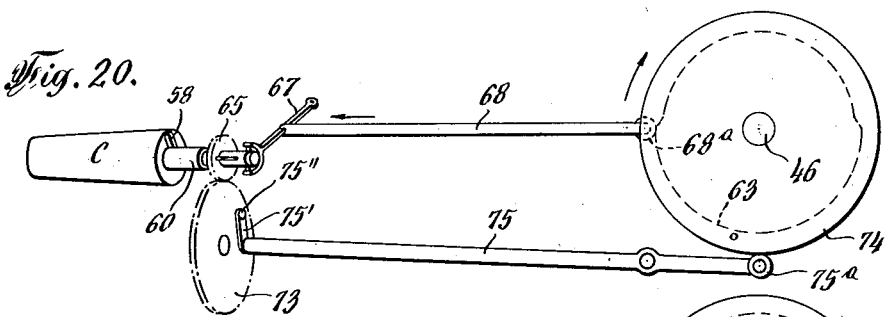
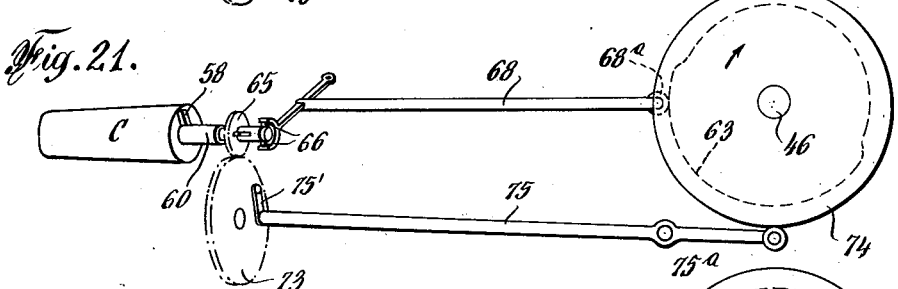
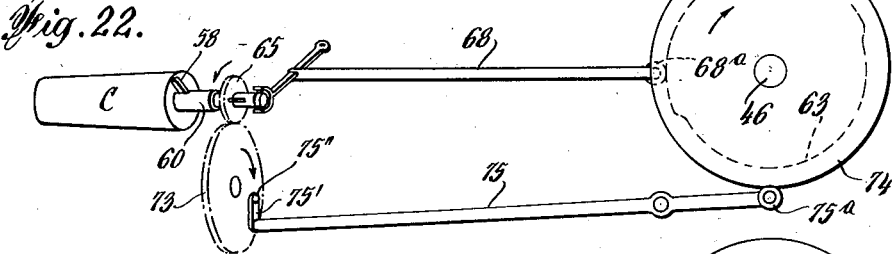
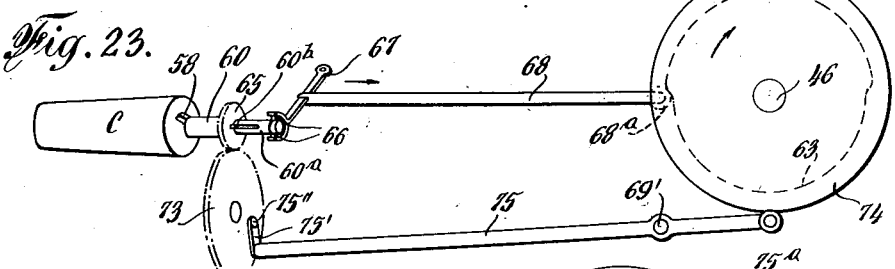
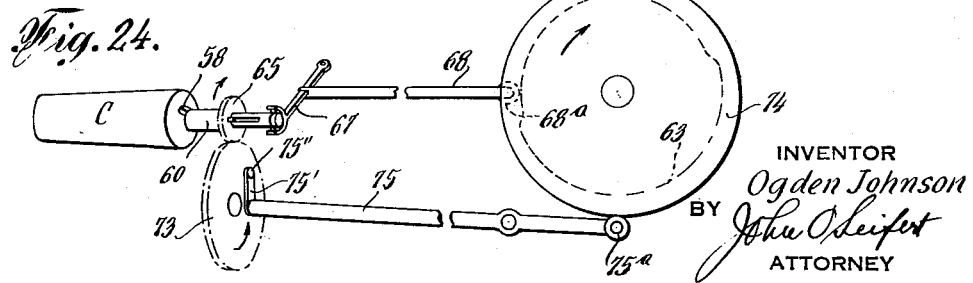
INVENTOR
Ogden Johnson
BY
ATTORNEY Jan. 9, 1940.　　　　O. JOHNSON　　　　2,186,073
CONTAINER AND MEANS FOR AND METHOD OF MAKING CONTAINERS
Filed June 24, 1938　　　　8 Sheets-Sheet 8
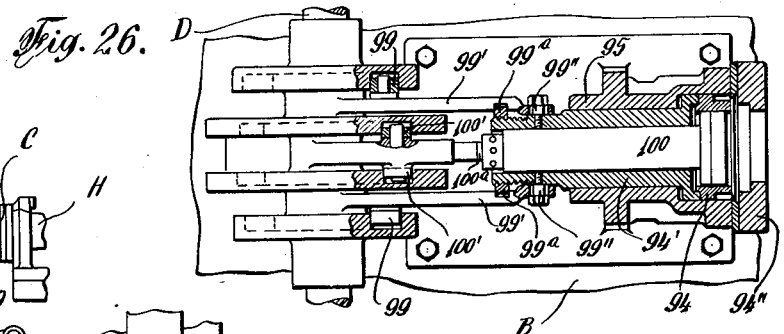
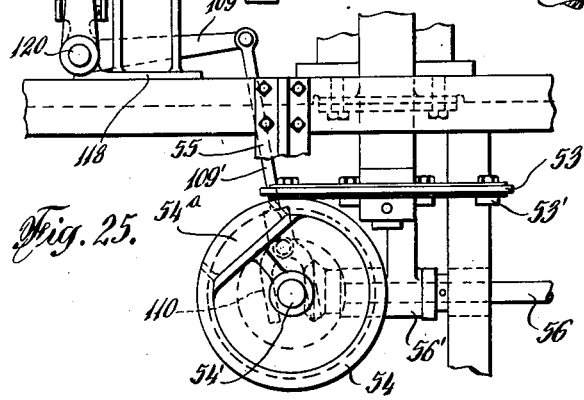
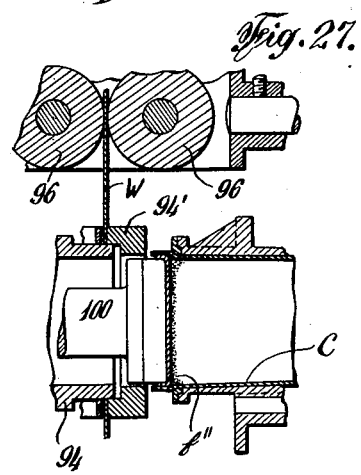
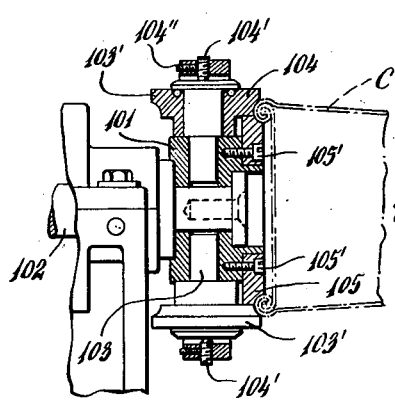
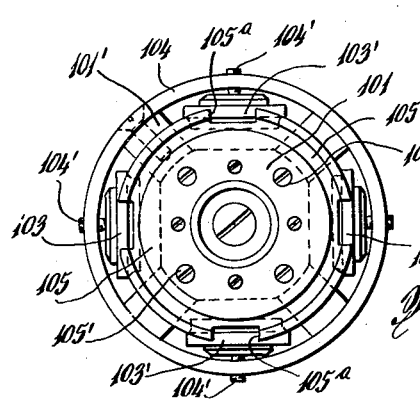
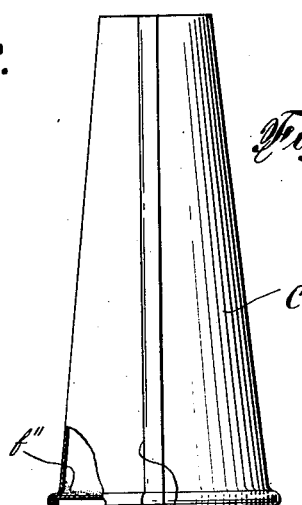
INVENTOR
Ogden Johnson
BY John O. Seifert
ATTORNEY Patented Jan. 9, 1940

2,186,073

UNITED STATES PATENT OFFICE 2,186,073

CONTAINER AND MEANS FOR AND METHOD OF MAKING CONTAINERS

Ogden Johnson, Bronxville, N. Y., assignor to American Sealcone Corporation, New York, N. Y., a corporation of New York Application June 24, 1938, Serial No. 215,533

36 Claims. (Cl. 93—39.1)

This invention relates to the making of containers having a body shaped from a blank to tubular form and secured at opposite marginal portions with a closure secured to one end of the body and the opposite end open to constitute the filler opening which may have a closure secured thereto or may be closed by pressing together opposite wall portions at the open end and sealed in said condition, and it relates particularly to the making of containers of fibrous material having applied to the entire surface of the container material, or only to the seam portions thereof, a coating of thermoplastic adhesive composition that is non-tacky at normal atmospheric temperatures and adapted to be rendered viscous and tacky when subjected to an elevated temperature, and having the property of being impervious to liquids and/or oil and grease to provide a liquid and/or oil and greaseproof container.

It is the primary object of the invention to provide an improved container having a liquid and/or oil and greaseproof coating or lining, and an improved method of and means for making the same.

In making containers of this character the container body is formed from a blank died out from a sheet or web having a surface coating of a composition impervious to liquid and/or oil and grease, and wrapped around a mandrel or horn conforming to the shape of the container body with the coating composition on the inside and the side marginal portions of the blank overlapping and secured in said condition with the coating material under heat and pressure. As the blank is severed from the sheet or web there will be no coating material on the edges of the blank, with the result that an edge of the overlapped marginal portions of the blank without coating material is exposed to the contents of the container.

It is an object of the invention to provide an improved method of and means for making containers of this character from fibrous material having a surface coating of a composition having the property of being impervious to liquids and/or oil and grease and applying a film of a coating material, preferably a thermoplastic composition, in a viscous state to the uncoated edge of the blank inside of the container body in successive sequence to shaping the blank and securing the blank with the coating material at the side marginal portions and thus provide the entire inside surface of the container body with a coating of the material.

In making containers of this character to arrange a container with a closure at one end, a peripherally flanged disk is inserted in an end of the container body while supported in a holder and the disk flange and end portion of the body interlocked or crimped together to secure the closure in the body. In so securing a closure in a container body, should the container be subjected to stresses and strains, portions of the bottom seam will separate with a consequent leakage of the contents from the container.

It is another object of the invention to provide an improved method of and means for applying a thermoplastic composition about the inside and adjacent an end of the container body in sufficient quantity to cause the closure member as it is inserted into the container body to crowd said material forwardly of the closure and cause a sealing fillet of said material to form at the juncture of the closure with the container body, and in successive sequence to inserting the closure in the container body interlock the closure flange and end portion of the container body to secure the closure therein, and should the container material be provided with a surface coating of thermoplastic composition adhesively unite and seal the interlocked portions with the coating material under heat and pressure.

It is a further object of the invention to provide apparatus for making containers of this character wherein a blank is shaped to body form about a mandrel with the coating material on the inside and secured with the coating material at overlapped marginal portions, and a series of hollow holders mounted on a rotatable turret intermittently operative to successively station the holders relative to the mandrel, to receive therein a body delivered from the mandrel, and the provision of means operative to apply a coating of a viscous thermoplastic composition to the seam formed by and an edge of the overlapped parts at the inside of the container body as the container body is delivered from the mandrel, and of means relative to which the container body in a holder is stationed by the rotation of the turret operative to apply a thermoplastic composition in a viscous state about the inside and adjacent an end of the container body preparatory to providing the container body with a closure at one end.

The material from which containers of this character are made is flexible and has an inherent springiness or resiliency that tends to cause the material to assume a flat condition. When the body blank is shaped about the mandrel to body form and secured in said condition at overlapped marginal portions of the blank, this resiliency of the material exerts a force on the body blank shaped about the mandrel, as well as in the finished container, that tends to separate the seam parts.

It is another object of the invention to provide an improved method of and means for forming a container body to prevent the resiliency of the container material to exert a force to separate the seam parts during the forming of a container blank to body form as well as in the finished container.

A further object of the invention is to provide in container making apparatus an improved construction and arrangement of a mandrel about which a blank is shaped to form a container body and a head co-operating with the mandrel to apply heat and pressure to overlapped marginal portions of the blank on the mandrel to adhesively secure the seam parts with a coating material thereon, to flatten the container blank at and in the region of said seam parts and arrange the body blank with a score line relative to one seam part to permit the same to be readily flexed relative to the body of the blank and offset said seam part on the score line laterally of the body of the blank and to prevent the springiness of the container material to exert a separating force on the seam parts during the forming of the container body.

In the drawings accompanying and forming a part of the application,

Figure 1 is a plan view of container making apparatus embodying the invention,

Figure 2 is an elevational view taken on the line 2—2 of Figure 1,

Figure 3 is a plan view of the parts taken on the line 3—3 of Figure 2, looking in the direction of the arrows, Figure 4 is a sectional view taken substantially on the line 4—4 of Figure 3, looking in the direction of the arrows, Figure 5 is a perspective view of one end of a container body and showing in stippling the manner of applying the closure securing coating material to the inner surface thereof, Figure 6 is a perspective view of a container body partly broken away and showing in stippling the coating material applied to an edge of and the seam formed by overlaping marginal portions of the container body.

Figure 7 is a sectional view taken substantially on the line 7—7 of Figure 3 looking in the direction of the arrows, Figure 8 is a sectional view taken on the line 8—8 of Figure 7, Figure 9 is a detail sectional view taken on the line 9—9 of Figure 8, Figure 10 is a fragmentary view in perspective of a portion of the means to apply the closure securing coating material to the inner surface of the container body, Figure 11 is a sectional view taken on the line 11—11 of Figure 13, Figure 12 is a cross sectional view taken on the line 12—12 of Figure 11, Figure 13 is a sectional view taken on the line 13—13 of Figure 11, Figure 14 is a sectional view of the upper portion of Figure 13 showing the parts in another position, Figure 15 is a sectional view taken on the line 15—15 of Figure 1, Figure 16 is a sectional view taken on the line 16—16 of Figure 17, Figure 17 is a view taken on the line 17—17 of Figure 16, Figure 18 is a perspective view of a mandrel and electrically heated head of a ram to apply heat and pressure to the side seam of a container body shaped about the mandrel to secure the overlapped portions of the seam by the coating material thereon, and the means for applying coating material to the seam and an edge of the formed container body as it is delivered from the mandrel and means to guide said seam portion of the container body relative to the coating material applying means, the parts being shown in position one relative to the other, Figure 19 is a cross sectional view of the pressure applying head and mandrel, the section of the parts being taken substantially on the line 19—19 of Figure 18 and showing the head in position to apply heat and pressure to the side seam of the body blank shaped about the mandrel, Figures 20 to 24 inclusive are diagrammatic views of the means to apply the closure securing coating material to the inner surface of a container body and showing the parts in different positions, Figure 25 is a side elevation taken substantially on the line 25—25 of Figure 1 looking in the direction of the arrows and showing the driving connection between the parts, Figures 26 and 27 are sectional detail views showing the method of and means for severing a closure disk from a web, and flanging and inserting the flange closure in a container body, Figure 28 is a sectional detail view and Figure 29 is a front elevation of means for interlocking the closure flange with the end of the body, and Figure 30 is a view of a container made in accordance with the method of and apparatus of the present application and partly broken away to show the sealing fillet of thermoplastic composition at the juncture of the closure with the body.

In carrying out the invention in making containers adapted for dispensing liquid and/or oil and grease therein, one surface of the container is provided with a surface coating of a thermoplastic composition having the property of being non-viscous and non-tacky at normal atmospheric temperatures and adapted to be rendered viscous and tacky when subjected to an elevated temperature. The thermoplastic composition is applied to a sheet or web of the container material and suitable blanks to form the body of a container and a closure for an end of the container body are severed from the web or sheet, the blanks being shaped to container body form and the closure secured in an end thereof with the coating material on the inner surface. The invention is also applicable for making containers wherein the container material is not first provided with a surface coating of thermoplastic composition and in which case the coating material is applied to the finished container. For this purpose the coating material is applied to a surface of a side marginal portion of the blank adapted to be lapped over another marginal portion of the blank in forming the container body and secured with the coating material by the application of heat and pressure, and the coating material is also applied to the marginal portions at the opposite ends of the blank whereby the closure, such as a bottom member, is adapted to be secured with the coating material on one of said end marginal portions, and a closure secured in the opposite end of the container body with the coating material on the other end marginal portion, or the opposite wall portions at said end of the container may be pressed together to close the same and secured in closed condition with the coating material.

The operative parts of the apparatus are mounted on a table or base B supported by standards. To shape a blank to tubular form to constitute a container body, a suitable blank, in the present instance of a shape to form a container body of truncated conical form, is shaped about a mandrel or horn 30 of truncated conical form conforming to the shape of the container body with the coated surface on the inside. The mandrel, as shown in Figures 2, 3, and 4, is mounted at the base end in a bracket 31 to extend in a horizontal plane. The blank b is fed from a stack of the blanks on a table t into register with a gauge g on a shelf s below the mandrel. The blank is fed manually or by mechanically operated means including grippers 32 carried by a pair of rods 32' (Figure 3) longitudinally reciprocatory from a drive shaft D, the rods reciprocating through openings in the gauge g and transverse recesses 30' in the mandrel below the axis thereof. The blank is shaped about the mandrel with a side marginal portion overlapping the opposite side marginal portion of the blank, as shown in Figure 19.

To shape a blank on the shelf s about the mandrel means are provided to lift the blank from the shelf, clamp the blank to the mandrel and then form or shape the blank about the mandrel, said means being substantially the same as the means shown in Patent No. 2,062,465, issued December 1, 1936, and comprising a vertically slidable plunger p having a head p' carrying a pad of yielding material and a pair of flaps 33 pivoted on arms 34 pivotally carried by a head 35 through which the plunger p extends, the head being mounted on the end of vertically reciprocatory plungers 36 juxtaposed to the plunger p. The arms are urged toward each other by a spring 37 to cause rollers 38 to travel relative to opposite sides of the plunger p. The plungers are reciprocated by means (not shown) including levers pivotally supported intermediate the ends with one end of the lever pivotally connected to the end of the plungers, the opposite end of the levers carrying rollers to follow cams rotated from the drive shaft D. As the plungers are moved upwardly the flaps and plunger head lift the blank from the shelf and as the blank approaches the mandrel 30 it is clamped thereto intermediate the sides by the plunger p. The flap carrying plungers 36 continue to move upwardly and by such movement the rollers 38 engage and travel relative to converging edge portions $p^2$ of the plunger p under the influence of the spring 37, causing the flaps to engage with and shape the blank about the mandrel under taut condition. To cause one marginal portion of the blank to engage below the other marginal portion one of the flaps slidably carries an auxiliary flap 33' normally urged by a spring $33^a$ to position forwardly of the front edge of the flap 33 and thus cause the one marginal portion of the blank to engage the mandrel prior to the other marginal portion and the latter to overlap the first marginal portion.

After the blank has been shaped about the mandrel heat and pressure is applied to the overlapping portions of the blank on the mandrel to secure the same with the coating material on the overlapping portion. This means comprises a head 39 (Figures 18 and 19) carried at one end of a lever 40, which is in the nature of a ram, arranged with oppositely extending trunnions 40' intermediate the ends thereof and whereby the lever is pivotally supported in bearings of brackets 41 mounted on the base B. The lever is rocked to move the head into and out of engagement with the mandrel by a roller carried at the end of the lever opposite the end carrying the head following a cam 42 fixed on the drive shaft D. The head 39 is adjustably mounted on the arm in alinement with the mandrel by means of bolts 39' engaged in openings extended through the ram and portions projecting from the opposite ends of the face thereof, as at $39^a$ in Figure 2, and threaded into openings 39'' in the head. The head is maintained in adjusted position relative to the ram by a threaded stud $39^b$ threaded into an opening in the head 39 intermediate the ends thereof and abutting the face of the ram between the projections $39^a$ as shown in Figure 19, and secured in adjusted position by nuts $39^c$. To heat the head 39 electric heating elements 43 are fixed to and extend longitudinally of the opposite sides of the head, the temperature to which the head is heated being controlled by a switch interposed in conductors 43' connecting the heating elements with a source of electric energy, the switch being arranged in a box $43^a$ carried by a bracket $43^b$ fixed to the ram and the switch actuated by a temperature responsive element $43^d$ positioned in a bore in the head with a part $43^e$ connected to the switch in the box $43^a$. The container material, while pliable, is somewhat springy and when moved out of its flat condition it tends to assume its flat condition by the inherent springiness of the material, and when the blank is shaped about the mandrel, as well as in the finished container, this springiness of the container exerts a force on the overlapping securing portions of the blank to spread the same. To overcome this disadvantage means are provided to flatten the blank in the region of the side seam of the container body and to longitudinally score the blank at the juncture of the overlapping portion of the blank and offset said marginal portion laterally relative to the body of the blank. For this purpose a member 30' of hardened material is inserted into the mandrel above the axis thereof, which member is provided with flat faces $30^a$ and $30^b$, arranged in different planes extending longitudinally of the mandrel, and one face, shown as the face $30^b$, is longitudinally fluted. The head 39 is also provided with flat faces arranged in different planes complemental to the faces on the mandrel insert, as clearly shown in Figures 18 and 19. By this arrangement of the head and mandrel insert as the head is brought into engagement with the portions of the blank overlapped on the mandrel the blank is longitudinally scored at the juncture of the overlapping portion of the blank with the body of the blank and the overlapping portion of the blank is offset laterally as shown in Figure 19. Simultaneously the material of the overlapped marginal portion is pressed into the flutes of the face $30^b$ thereby holding the same against lateral movement, and the overlapping portion held against lateral movement by the shoulder formed by the one face on the head engaging the blank on the mandrel at the point of the offset overlapping portion. In this position of the parts the heat and pressure is applied to the overlapping portions causing the thermoplastic composition on the one face to first fuse and then set and thereby secure said portions with the thermoplastic composition. After a predetermined period of time the arm 40 is actuated to move the head 39 out of engagement with the blank on the mandrel and the formed container body is delivered from the mandrel by ejector means comprising fingers 44 fixed to rods 44' slidably mounted in the bracket 31 at opposite sides and axially of the mandrel. The fingers have a forwardly projecting portion of reduced thickness slidably engaging in recesses 44ᵃ in opposite sides of the mandrel and within a container body shaped about the mandrel, the reduced portions arranging the fingers with a laterally extending shoulder, as shown in Figure 3, adapted to engage the edge at the end of the body as the fingers are moved forwardly by the rods. The rods are connected to a cross head 44ᵇ having a headed rod 44ᶜ fixed in and extending therefrom opposite the finger carrying rods, the rod 44ᶜ slidably engaging in an opening in a laterally extending projection of a slide 45 slidably mounted on parallel rails 45' fixed at one end upon the bracket 31 and at the opposite end to a bracket 45ᵃ fixed upon the table B. The rod 44ᶜ is of greater length than the width of the projection of slide 45 whereby the head is adapted to have a slight free movement relative to the rod 44ᶜ, a spring 44ᵈ interposed between the projection of slide 45 and head 44ᵇ cushioning the ejecting movement of the finger carrying rods 44'. The ejector means is actuated in timed sequence with the shaping of a blank about the mandrel and the actuation of the ram to move the heat and pressure applying head into and out of engagement with the mandrel by a shaft 46 having a gear connection with and driven from the shaft D, a crank arm 46' fixed on the shaft 46 being pivotally connected to an arm 46ᵃ pivoted on the slide 45.

In making containers from a web or sheet having a surface coating of thermoplastic material and the body forming blank severed from the web or sheet, the edge of the blank is not coated with the thermoplastic composition and as the blank is shaped about the mandrel with the surface coating on the inside and secured by an overlapping portion, the edge of the overlapped portion is not coated with the thermoplastic composition, and means are provided to apply thermoplastic composition, in a viscous state to said edge and provide a fillet f, as shown in Figure 6, of the composition at the seam formed by the overlapping portions as the container body C is ejected from the mandrel. For this purpose there is provided a trough 47 containing the thermoplastic composition with a peripherally grooved wheel 47' rotatably mounted in the trough having a peripheral portion projecting from the top of the trough. The trough, as shown in Figure 18, is mounted on an undercut portion at the free end of the mandrel with the wheel rotating in a plane coincident with the seam and uncoated edge of the container body. As the container body is ejected from the mandrel it is guided and caused to be engaged by the wheel 47' with the uncoated edge and seam moving relative to the groove in the wheel. For this purpose an arm 48 is fixed at one end on or is integral with a bracket 48' fixed upon the shelf s, the arm extending transversely of and spaced above the mandrel. The under edge of said arm is arranged with an inverted V shaped recess the apex of which is in line with the juncture of the faces 30ᵇ on the mandrel insert. A pair of guides in the form of angle members 49 are mounted at one angle portion on the arm 48, one guide relative to each inclined wall of the recess in the arm so that the arms converge toward each other and the wheel 47', the other angle portion of said guides extending forwardly of the arm, as clearly shown in Figure 18. As the container body is ejected from the mandrel it is engaged with and is moved relative to the wheel 47' thereby imparting rotation to the wheel and the wheel applying the thermoplastic composition from the trough to the edge and seam on the inside of the container body.

The container body ejected from the mandrel is delivered into one of a series of hollow holders H fixed on a disk member 50 of a turret (Figure 15) intermittently rotatable on a vertical axis. In the present instance the holders are twelve in number extending radially of and equidistantly spaced about the turret (Figure 1) and are mounted on the turret disk to be revolved in a horizontal plane coincident with the mandrel. The construction of the turret and the means to rotatably support and rotate the turret is substantially the same as that disclosed in application Serial No. 60,645, filed January 24, 1936, which matured in Patent No. 2,117,205. The disk member is provided with a laterally extending hub having a tapering bore engaged upon and keyed to the tapered end of a shaft 51, shown at 51' in Figure 15, the shaft being supported through an antifriction thrust bearing 51ᵃ on a shoulder of a sleeve 52 extended through an opening in and fixed upon the table B. The bore in the holders is tapered to conform to the shape of the container body, and the holders are of less length than the body whereby a container body engaged in a holder will extend from the opposite ends thereof. Means are provided to intermittently rotate the turret to station successive holders relative to the mandrel, and as shown in Figure 25 comprises a disk 53 fixed to the end of the shaft 51 extended from the lower end of the sleeve 52. The disk carries a series of rollers 53' equal in number to the holders and equally spaced about and projecting from the under face of the disk. A drum 54 of a length equal to the space between the rollers is fixed on a shaft 54' rotatable on an axis extending in the plane of the orbit of movement of the rollers 53', the shaft being journaled in a bearing of a bracket 55 fixed to and extending downwardly from the table B and has a gear drive connection with and rotated from a shaft 56 journaled in a bearing in a bracket 56', the shaft 56 being driven from the shaft D. The drum 54, as stated, is of a length equal to the space between the rollers 53' and is provided with a cam groove in a portion 54ᵃ inserted in a peripheral portion of the drum with the cam groove extending diagonally of the periphery of the drum with the entrance to the cam at one end of the drum and the outlet at the opposite end of the drum, whereby as the drum is rotated and the entrance to the cam groove approaches a roller 53' the roller will engage in the cam groove and be transferred from one end to the opposite end of the drum and imparting movement to the roller carrying disk 53 and thereby to the holder carrier to move a holder from and station the successive holder relative to the mandrel, and the drum being of a length equal to the space between the disk rollers 53' it will hold the turret against movement during the periods of rest.

As a holder with a container body delivered therein from the mandrel is moved with the turret away from the mandrel it is stationed relative to means to apply thermoplastic composition in a strip about the inside and adjacent the end of a portion of the container body projecting from the holder, as shown at f' in Figure 5, to provide a sealing fillet of such composition at the juncture of the container body with a closure inserted in said end of the container body, and with which thermoplastic composition a closure may be secured in said end of the container body. This means is carried by a vertically extending portion of a support 57 fixed upon the table B having an arcuate recess in the top, a cap 57' fixed to the top of said support being arranged with an arcuate recess opposed to the recess in the support and forming an opening 57ᵃ relative to which a holder is stationed in opposed and spaced relation thereto as it is moved from the mandrel. A trough 58 to contain the thermoplastic composition a viscous state is mounted on and projects from a periperal wall portion of a carrier in the form of a cup member 59 therefor, a peripherally grooved wheel 58' being rotatably mounted in the trough with a peripheral portion projecting from the top thereof. The trough carrier is mounted to have reciprocatory movement to position the trough inside a body in a holder stationed relative to said thermoplastic composition applying means, rotate the carrier in said position to apply a band of the composition to the inside of the container and move the trough carrier out of the container. As shown, the trough carrier is mounted on a head 60 mounted to have rotary and longitudinal reciprocatory movement in a sleeve 61 mounted in the opening 57ᵃ in the support 57. For this purpose an arm 62 is fixed at one end to the end of and within the trough carrier 59 and extends into a longitudinal recess 60' extended into the end and peripheral wall of the head 60, the arm being pivotally supported at the opposite end by the head, as at 62', to have pivotal movement on an axis extending transversely of the head and mounting the trough carrier on the head with the flange thereof disposed relative to a reduced portion of the sleeve 61, as clearly shown in Figure 8.

The head 60 is normally positioned as shown in Figure 8 and is reciprocated to position the trough carrier 59 inside a container body C in a holder H stationed relative to said means, as shown in Figure 13, and return the head to normal position, and as shown in Figures 1, 2 and 3, is effected by a cam 63 fixed on the shaft 46. To operatively connect and reciprocate the head 60 from the cam 63 the head is provided with a reduced portion 60ᵃ at the end opposite the end on which the trough carrier is mounted, which is extended through and slidable in an opening in a plate 64 fixed to and extending parallelly of the support 57 and spaced therefrom by blocks 64' interposed between the ends of said plate and the support. A key 60ᵇ fixed in the reduced portion 60ᵃ of the head is adapted to slidably engage in a slot in the plate 64, as shown in Figure 8, and in a keyway in a pinion 65 mounted on said reduced portion of the head between the plate 64 and sleeve 61, whereby the head is adapted to rotate with the pinion and the pinion have rotary movement on the reduced portion 60ᵃ of the head. The end of the reduced portion of the head is annularly recessed, as at 60ᶜ, for the engagement of pins 66 fixed in and extending inwardly from the arms of a bifurcation at the end of a lever 67 pivotally mounted at the opposite end, as at 67', on a lug fixed to or integral with and extending laterally from one of the supporting brackets 41 for the lever arm 40, as shown in Figure 3. A rod 68 is pivotally connected at one end to the lever 67 intermediate the ends thereof, as at 68', and slidably mounted in an arm of a bracket 69 fixed upon the table B and carries a roller 68ᵃ caused to follow the cam 63 by a spring 70 attached at one end to the rod 68 and at the opposite end to the bracket 69. As the trough carrier 59 is engaged in the container body, it is caused to move laterally of the head 60 and yieldingly engage the thermoplastic composition applying wheel 58' with the inside of the container body by a spring 71, as shown in Figure 13. The spring is engaged at one end in an opening in the head 60 and seated against a plug threaded into the opening, as at 71', and whereby the tension of the spring may be varied, the opposite end of the spring engaging a plug threaded into an opening in the lever 62 with an end portion thereof extending from the outer side of the lever beveled, as at 72ᵃ. In the normal position of the trough carrier 59 with the flange engaging the reduced portion of the sleeve 61 the plug 72ᵃ is positioned within the head recess 60' with the plug engaging the sleeve, as shown in Figure 8. As the head is moved outwardly from the sleeve 61, the plug 72ᵃ will ride off from the sleeve and the trough carrier will be moved laterally by the spring 71 and engage the thermoplastic composition applying wheel into engagement with the container body. As return movement is imparted to the head with the trough carrier the beveled end of the plug 72ᵃ will engage the inner side of the sleeve 61 and the carrier thereby moved to the position shown in Figure 8.

To rotate the head 60 and thereby revolve the thermoplastic composition applying wheel about the inside of the container body to apply an endless band or strip of the thermoplastic composition about the inside and adjacent the end of the container body, as shown at f' in Figure 5, means are provided to impart rotary movement to the trough carrier after it has been engaged in the container. This means, as shown, comprises a gear 73 loosely mounted on a stud shaft 73' mounted in openings in the support 57 and plate 64, as shown in Figure 8, and meshes with the pinion 65 mounted on the reduced portion 60ᵃ of the head 60. The gear is operatively connected to and rotated from a cam 74, comprising a disk mounted eccentrically on the shaft 46 in juxtaposed relation to the head reciprocating cam 63, by a lever 75 pivoted at 69' intermediate the ends on the bracket 69 (Figure 2) on which the head reciprocating rod 68 is slidable, the lever being connected at one end to the gear 73 by a link 75' pivotally connected at one end to the lever and at the opposite end to the gear 73 eccentric to the axis thereof, as at 75''. The other arm of the lever carries a roller 75ᵃ caused to engage and follow the cam 74, as shown in Figures 2 and 20 to 24, inclusive, by a spring 75ᵇ attached at one end to a pin fixed in and extending laterally from an upright arm fixed to the lever and at the opposite end attached to a fixed part of the apparatus, as shown in Figure 2.

In Figures 20 to 24, inclusive, there is shown in a diagrammatic manner the method of and the means for moving the head 60 on which the thermoplastic composition supplying means is mounted into and out of a container body in a holder stationed relative to said means and to transmit rotary movement to said head. The parts are shown in normal position in Figure 24 with the cam following roller 68ª carried by rod 68 engaging the cam 60 relative to a low portion thereof, and the roller 75ª carried by lever 75 positioned relative to the high portion of cam 74. By the continued rotation of the cams roller 68ª carried by rod 68 will ride onto the high portion of cam 63, as shown in Figure 20, and by its connection with the lever 67 will move the head 60 to the left and engage the thermoplastic composition applying means in the container C. By this movement of the head the beveled end of the plug 72ª will ride off from the sleeve 61 permitting the carrier to be moved laterally under the influence of spring 71 and engaging the wheel 58' with the interior surface of the container, and the key 60ᵇ fixed in the reduced portion 60ª of the head is moved out of the keyway in plate 64 into the keyway in the pinion 65 coupling said pinion and thereby the gear 73 to the head. During this period of rotation of the cam the roller carried by lever 75 travels relative to the high portion of cam 74 and the parts will assume the position shown in Figure 21 with roller 75ª carried by lever 75 at the commencement of the low portion of cam 74, and as said roller travels relative to said low portion of cam 74 lever 75 will be rocked and by its connection through the link 75' with the gear 73 will rotate said gear in the direction indicated by the arrow in Figure 22 and transmit said rotary movement of the gear to one complete revolution of the pinion 65 and the head 60, and thereby revolve the thermoplastic composition applying wheel 58 about the inside of the container and transfer thermoplastic composition from the trough 58 to the container C in a band, as shown at f' in Figure 5. At the termination of the travel of the roller carried by lever 75 relative to the low portion of cam 74 and as it begins to ride up the high portion of cam 74, as shown in Figure 23, the roller carried by rod 68 will ride off from the high portion of cam 63 and thereby move the head 60 and the thermoplastic composition applying means carried thereby out of the container, and moving the key 60ᵇ carried by head 60 out of the keyway in pinion 65 and into the keyway in the plate 64, permitting the pinion to rotate freely on the reduced portion of the head 60 and locking the head against rotation. In this position of the parts retrograde movement is imparted to the gear 73 by the roller carried by lever 75 riding up the high portion of cam 74 rotating the pinion 65 reversely through a complete revolution the parts assuming substantially the position shown in Figure 24 when the cycle of operations is repeated. As retrograde movement is imparted to the head and the thermoplastic composition applying means carried thereby, the beveled end of the plug 72ª will engage the sleeve and cause the carrier with the thermoplastic applying means to be moved to the position shown in Figure 8. By the closed arrangement of the trough 58 with only a peripheral portion of the wheel 58' projecting through an opening therein, and as the thermoplastic composition is viscous and slow flowing, it will not spill from the trough as the trough is moved about the inside of the container, said movement tending only to supply so much of the thermoplastic composition to the wheel 58' as is sufficient to apply a strip of the thermoplastic composition about the inside of the container.

The composition is a highly volatile material and tends to quickly set and harden, and it also has the property, when in a viscous state and combined with hardened or partially hardened composition, to function as a solvent therefor. Should the troughs 47 and 58 be of larger capacity than the thermoplastic composition delivered thereto in indefinite amounts the composition would harden and render the applying wheels inoperative to transfer the composition from the trough and apply it to a container. Also, the peripherally grooved composition applying wheels will pick up the composition and transfer it from the trough to a container proportional to the quantity and level of the composition in the troughs. The troughs 47, 58, therefore, are made of small capacity and means are provided to supply the thermoplastic composition to the troughs in successive predetermined metered quantities after each application of the composition by the wheels 47', 58' and compensate for variations in the application of the composition to a container, thus preventing evaporation of the solvent in the composition and the consequent hardening of the composition during the intervals of applying the composition to containers. This means comprises, as shown in Figures 4, 7, 8 and 11 to 14, inclusive, a pair of pumps each including a body in the form of a block 76 mounted in juxtaposed relation on a lug projecting from a side of the lever arm 40, as shown in Figure 4. Each block has a chamber therein with an inlet 77 in the top and a receptacle 78 for the thermoplastic composition having an outlet mounted on each block with the outlet connected by a tube 78' of transparent material in communication with the inlet 77 to the chamber in the pump bodies. The connecting means includes a coupling 78'' having an opening through which to observe the connecting tubes 78' to ascertain whether or not thermoplastic composition is being delivered from the receptacles. The inlet 77 communicates with a transverse bore portion 79 of the chamber extended into the side wall of the blocks and closed by a plug 76, and communication between the bore portion 79 and the inlet is controlled by a valve, shown in the form of a ball valve 79', urged to its seat at the connection of the inlet with the chamber by a spring 79''. A vertical bore portion 79ª of the pump chamber extended inwardly from the bottom of the pump bodies is in communication with the bore 79 and a transverse bore portion having two diameters 79ᵇ and 79ᶜ, is extended into the side of the pump bodies and communicates with the bore portion 79ª with the portion of the bore chamber of larger diameter at the outer end and formed with a valve seat at the juncture thereof with the portion of smaller diameter, as at 79ᵈ, the outlet 79ᵉ of the pump chambers leading from the portion of the bore chamber 79ᵇ and opening through the bottom of the pump bodies. Communication between the outlet 79ᵉ and the pump chambers is controlled by a valve 79ᶠ having a head slidable in the bore portion 79ᵇ and a tubular portion extending therefrom slidably engaging in the bore portion 79ᶜ and arranged with a circular row of ports adjacent the juncture thereof with the head. The under side of the head is shaped to conform to the valve seat 79ᵈ and the valve is urged to engage said seat by a spring 79ᵍ interposed between the valve head and a plug threaded into the bore portion 79ᵇ, the valve head being preferably arranged with a stem to engage within the spring, as shown.

An expansible and contractile hollow body arranged with a chamber therein is connected in communication with the bore port 79ᵃ of each pump chamber to receive thermoplastic composition therein. These bodies comprise a tubular member 80 (Figure 14) screw threaded into the bore portion 79ᵃ and having a laterally extending flange at the outer end and a tubular body of resilient material 80' circumferentially corrugated to arrange the same of bellows form is secured at one end to the flange of the member 80. The corrugations at the opposite end of the members 80' are of reduced diameter with a disk 80" secured to and closing said end of the body, the disk 80" having an outer globose face as shown. Tubes 81 and 81' are connected to the outlet 79ᵉ of the pump chambers, the one tube 81 leading to and having a vertical portion at the end disposed above the wheel 47' and top of the trough 47 to discharge thermoplastic composition from the tube onto the wheel and into the trough 47. The other tube 81' leads to and with the outlet arranged above the wheel 58' in the trough 58 to deposit the thermoplastic composition from the tube onto said wheel and thereby into the trough 58, as shown in Figure 8.

The inlet to and the outlet from the pump chambers are normally closed by the valves 79' and 79ᶠ and the pump chambers and the chambers in the contractile and expansible members 80' filled with the thermoplastic composition, with the thermoplastic composition in the pump chambers shut off from the atmosphere and there will be no evaporation of the solvent nor setting of the composition in the pump chambers. The members 80' normally assume their expanded position under the inherent tension of the material thereof, as shown in Figures 11 and 13, and the thermoplastic composition is discharged from the pump chambers by contracting said members, as shown in Figure 14. The contracting of the members 80' exerts pressure on the thermoplastic composition in the pump chambers which exerts a force on the ball valves 79' to seat the same and exerts a force on the head of the valves 79ᶠ through the tubular portion thereof and unseats the valve head against the tension of the springs 79ᵍ and discharges the thermoplastic composition through the valve ports into the tubes 81, 81' to the respective troughs 47 and 58. As the members 80' expand suction is created in the pump chambers and the valves 79ᶠ move toward their seat, such movement of said valves will first shut off the bore portions 79ᵇ from the bore portions 79ᵃ and as the heads of the valves move to their seats suction is created in the outlet pipes 81, 81' quickly breaking the stream of the composition at the outlet of said tubes and drawing the composition into the tubes so that it will not accumulate as a blob at the outlet exposed to the atmosphere and a consequent evaporation of the solvent in the composition and setting of the composition and thus form a closure plug at the outlet of the tubes. During the expanding movement of the members 80' the ball valves 79' are withdrawn from their seats permitting thermoplastic composition to flow into the pump chambers from the receptacles 78 through their connections with the pump chambers.

The pumps are automatically operated and the operation thereof controlled by the projecting end of a container body in a holder as the holder is moved from its station at the mandrel to its successive station relative to the means for applying thermoplastic composition about the inside and adjacent an end of the container body in the holder, and adjustable means are provided to deliver a measured or metered quantity of the composition by the pumps. This means comprises right angle levers, the levers being pivotally carried, as at 82, by a bracket 82' fixed to the rear of each pump body and extending downwardly below the bottom thereof with one arm 83 disposed below a contractile and expansible member 80' and the other arm 83' extending upwardly and normally urged to position to extend parallelly of the bracket 82' by springs 83" (Figure 8) attached at one end to the lever arm 83' and the other end attached to a part fixed on the side of the pump bodies. The lever arms 83' each adjustably carries an abutment 84 intermediate the ends thereof to extend from said lever arms toward the end 91" of the arms 91, as shown in Figure 8. The adjustment of the abutments 84 relative to the end 91" of the arms 91 controls the operation of the lever arms 83 and compression of the members 80' and quantity of the composition delivered by the pumps. A pair of brackets 85 are fixed in spaced relation upon the cap 57', the brackets being provided with a portion 85' extending forwardly and upwardly and positioned below the pump bodies forwardly of the expansible and contractile members 80', as shown in Figures 12 and 13. A shaft 86 is loosely mounted in the portions 85' of the brackets and has arms 87 fixed on the ends thereof projecting from the portions 85' of the brackets and secured to the shaft, as by set screws 87'. A member 88 of arcuate form in longitudinal section is fixed to the arms 87 intermediate the ends thereof by screws extended downwardly through openings in said arms 87 and threaded into the member 88 with a spacing sleeve 87" interposed between the arms and said member. The member 88 extends transversely below and in spaced relation to said arms with the convex side of the member opposed to the arms 87, the ends of the member 88 being curved upwardly, as shown at 88' in Figure 7.

The bar 88 is yieldingly urged downward to predetermined position with a stop 89 carried by and extending laterally from an arm 87 engaging the end of a bracket projection 85' by springs 90 attached at one end to a pin fixed in and extending laterally from the arms 87 and the opposite ends of the springs attached to pins fixed in and extending laterally from the support 57, as shown in Figures 7, 11, 12 and 13. A pair of arms 91 are loosely mounted on the shaft 86 in spaced and abutting relation to the bracket projections 85' by the sleeve portion of a member 92 fixed on the shaft and having laterally extending spaced arms 92'. The arms 91 are urged, one independent of the other, to position in engagement with a bar 93 fixed at the ends in and extending between the bracket projections 85' whereby the arms incline upwardly from the shaft 86 at substantially 45° to the horizontal by springs 91'—one end of the springs being attached to a pin fixed in and extending laterally from an arm 91 and at the other end to a pin extended from a sleeve arm 92', and the other spring attached at one end to a pin fixed in and extending from the other sleeve arm 92' and at the opposite end attached to a pin fixed in and extended laterally from the other arm 91. The free end of each arm 91 is arranged to extend at a right angle to the longitudinal axis of the arms and extended laterally from one side of the arms and the arms normally assuming a position relative to the abutments 84, as shown in dot and dash lines in Figure 13.

As the holder H is moved from the mandrel to the successive station should there be a container body in the holder with the end projecting therefrom said projecting end of the container body will pass below the upwardly curved end of the bar 88 and engage the bar and lift the same as it approaches the portion of the bar intermediate the supporting screws 87' when the holder carrier is brought to rest, the container body through the bar 88 having imparted relative movement to the shaft 86 to position the parts substantially as shown in full lines in Figure 13 with the end of the arms 91 disposed in opposed relation to the end of the abutments 84. In this position of the parts as the ram 40 is actuated to engage the head carried thereby with the mandrel 30, the abutments 84 will be moved downwardly with the ram, the abutments 84 engaging and riding upon the end of the arms 91 and thereby moving the one lever arm 83' on which the abutment is mounted laterally and the other lever arm 83 upwardly and contracting the members 80' in communication with the pump chambers and exerting pressure on the thermoplastic composition in the pump chambers to actuate the outlet valves 79ᶠ to open the outlet 79ᵉ of the pump chambers and discharge of the material through the tubes 81, 81' to the troughs 47, 58 to supply the thermoplastic composition thereto. The operation of the levers 83, 83' and compression of the members 80' and quantity of composition discharged by the pumps is controlled and regulated by the adjustment of the abutments 84 relative to the end 91'' of the arms 91. As a further intermittent movement is transmitted to the turret carrying the holders H the end of the container body in the holder will ride from below the bar 88 and permit the arms to assume the dot and dash line position shown in Figure 13, and as the ram 40 is actuated to move the head 39 out of engagement with the mandrel the levers 83, 83' are moved into the position shown in Figure 13 by the expansion of the members 80' and under the influence of the springs 83''. During this movement of the members 80' the inlet valve 79' will be actuated to open the inlet and permit thermoplastic composition to flow from the receptacles 78 into and fill the pump chambers. The parts will remain in said position until the projecting end of a container body in another holder H passes below the bar 88 when the operation of the means to apply thermoplastic composition to the troughs is repeated. It will be obvious that should there be no container body in a holder when it leaves its station relative to the mandrel, that the pumps will remain inactive to deliver thermoplastic composition.

The container body in a holder with thermoplastic composition applied about the inside adjacent the end of the container body is successively stationed relative to means to sever a disk from a web of material, peripherally flange the disk and engage the disk in the end of the container body with the thermoplastic composition applied thereto, and shown in a general way at A in Figure 1. This means, as shown in Figures 26 and 27, is similar to that disclosed in Patent No. 2,117,295, hereinbefore referred to, and comprises a tubular cutter 94 connected to the end of a tubular carrier 94' slidable in a sleeve 95 in a bracket fixed upon the table B, the tubular cutter co-operating with a die plate 94'' to sever a disk from a web W fed between the same from a roll of such material by a pair of rollers 96 intermittently rotated through the pawl and ratchet means 97 (Figure 1) operated from a cam 98 on the shaft D by a roller following the cam carried by a rod 98' connected to the pawl carrier of the pawl and ratchet means. A gear rotatable with the ratchet wheel meshes with a pinion on one end of a shaft, as at 97' and the rollers are positively driven from the pinion carrying shaft through gearing 97.'' The cutter carrier 94' is actuated by rollers engaging cam grooves in disks fixed on the shaft D, as at 99, the rollers being carried by rods 99' pivotally engaged on screws threaded into the carrier 94', as at 99'', and a collar screw threaded onto the carrier engaging recesses in the rods, as at 99ᵃ, the rods 99' having yoke portions at the end straddling the shaft D.

After the disk has been cut from the web it is peripherally flanged by a head on a plunger 100 moving relative to an opening of reduced diameter in the die plate 94'' and forcing the disk therethrough, the plunger being actuated by rollers engaging cam grooves, as at 100' in the disks fixed on the shaft D, the rollers being carried at opposite sides of a rod 100ᵃ connected to the plunger and having a yoke portion straddling the shaft D. In successive sequence with peripherally flanging the closure disk it is engaged in the end of the body having the thermoplastic composition applied thereto and projecting from the end of a holder stationed in alinement with the closure forming means, as shown in Figure 27. The projecting end of the container body tapers outwardly and the disk flanging head with the disk thereon is of a diameter that is the mean diameter of said projecting portion of the container body, and as the plunger head inserts the flanged closure disk in said end of the container body it will arrange it of uniform diameter and simultaneously longitudinally and laterally displace the projecting portion of the container body projecting from the end of the holder H and arrange the body with an annular shoulder against which the closure disk is seated. As the band of composition f' is applied to the container it partly dissolves the coating material on the container and as the closure disk is inserted into the container body it crowds the surplus composition forwardly of the closure disks and forms it as a sealing fillet at the juncture of the closure disk with the body, as shown at f'', and the remainder of the composition sealing the closure disk in the body.

The holders H are successively moved from the closure forming and inserting means and stationed relative to means to interlock the flange of the closure disk inserted in a container body in the holder and the end portion of the container body, said means being located at station E (Figure 1) and comprises a spinning head, as shown in Figures 28 and 29, including a block 101 fixed on the reduced end of a shaft 102. Headed studs 103 are mounted in the block 101 and extend radially of and equidistantly spaced about the block, with rollers 103' rotatable on said studs having an annular enlargement at the end with an annular recess of arcuate form in cross section in the lower corner of the enlargement. The studs are retained in position by a ring 104 disposed about the heads of the studs by screws 104' threaded into openings in said ring engaging the end of the studs, and the screws retained in position by set screws 104'', the ring being secured to projections extending radially from the corners of the block 101 by screws, as shown at 101' in Figure 29. A plate 105 is secured to the face of the block 101 by screws 105', the plate having an annular recess 105" of semicircular form in cross section in the face adjacent the periphery thereof, the plate having cut-outs 105ᵃ in line with the roller carrying studs, the cut-outs extending substantially midway of the groove 105" and co-operating with the annular recess in the rollers to constitute a continuation of the annular plate recess 105". The head carrying shaft 102 is slidable and rotatably mounted in a bracket 106 fixed upon the table B and rotated by a motor M also mounted on the table B. The head carrying the shaft 102 is operatively connected to the motor shaft to rotate therewith and permit of axial movement of the head carrying shaft by pins fixed in a collar 107 mounted on the shaft 102 to rotate therewith and have sliding movement thereon, the pins slidably engaging in a collar 107' fixed on the motor shaft. To reciprocate the head toward and away from a holder stationed relative thereto pins extended inwardly from bifurcated arms engage an annular recess in the collar 107, as at 108, the arms being fixed to and extending upwardly through the bracket 106 from a shaft 108' rotatable in the bracket and an arm 108" fixed to said shaft is connected to an intermediate portion and arm 109 and said latter arm connected to a rod 109' having a bifurcated member at the end straddling the shaft 54' (Figure 25) and carrying a roller following a cam on said shaft, as at 110. As the spinning head is moved toward the container body in the holder stationed relative thereto, the disk groove 105" and groove in the rollers will engage with and turn the end portion of the body inwardly over the closure flange and the flanged end of the body and closure flange upon themselves, as indicated by the container shown in dot and dash lines in relation to the spinning head.

By the successive intermittent movement of the holder carrying turret the holder with the container body having a closure disk secured therein is moved from station E to station F (Figure 1) where the interlocked end of the container body and closure is subjected to heat and pressure to fuse the coating of thermoplastic composition on the contacting faces of the disk flange and body and then cause it to set to unite said parts with the coating material thereon. This means comprises, as shown in Figures 15, 16 and 17, a head including a pair of releasably connected disks 111, 111' each having an annular recess in the adjacent faces forming an annular chamber 111ᵃ between the disks, and each disk having a recess cut inwardly from the periphery of the disks and communicating with the annular recess forming a passage 111ᵇ communicating with the chamber 111ᵃ. An electric heating coil 112 of annular form is arranged in the chamber 111ᵃ between the head disks with the terminals of the coil arranged in insulating material extended through the passage 111ᵇ from the chamber 111ᵃ, as shown at 112' in Figure 17. An annular recess of semicircular form in cross section is arranged in the face of the disk 111' adapted to engage the interlocked end of the container body and closure flange, as shown at 113. The disk 111 is provided at the rear thereof with a disk of heat insulating material 114. The head is adapted to have reciprocatory movement toward and away from the holder stationed relative thereto. The heating element carrying head is connected to the flange of a sleeve 116 by headed screws 117 extended through openings in the sleeve flange and the disk of insulating material and threaded into the disk 111, and the heating element carrying head urged away from the sleeve flange by springs 117' coiled about the screws and confined between the sleeve flange and head disk 111. The sleeve 116 is held against rotation and slidable in the bearing of a bracket 118 by a key fixed in the sleeve slidably engaging a key-way in the bearing, as at 116'. The sleeve 116 is fixed to a shaft 115 slidable in a bushing fixed in the bracket 118, as at 118'. The end of the shaft is rounded and engages in a correspondingly formed socket axially in the head disk 111 as at 115' and the shaft urged with the heating element carrying head to the right, as shown in Figures 15 and 16, by a spring 119 coiled about the shaft and interposed between the bushing 118' and the sleeve 116, as clearly shown in Figure 15. To reciprocate the shaft 115 with the heating element carrying head to move the head toward and away from the holder H stationed relative thereto, a peripheral groove in a collar 119' fixed on the shaft 115 is engaged by rollers carried on the arms of a bifurcated member, as at 119ᵃ, of an arm fixed to and extending upwardly from a shaft 120 rotatable in bearings of a portion extended forwardly from the bracket 118 and to which shaft the arm 109 is fixed, the shaft with the heating element carrying head being reciprocated from the cam that reciprocates the spinning head carrying shaft.

The holders H by the intermittent rotation of the turrret at successively stationed at station G where the container is ejected from the holder. The means to eject the container from the holders comprises a flanged head 121 (Figure 15) mounted relative to each other on the reduced end of a shaft 122 fixed at the reduced end in a block 123 slidable in a sleeve 124 fixed in an angle portion of a right angle bracket 125 fixed at the other angle portion upon a slide 126 slidable in a recess in the base of the holder support whereby the slides are mounted upon the turret disk, as shown at 127. The shaft 122 is extended to and slidable in a bushing 128 fixed in the end of the sleeve 124 by which it is fixed in the bracket 125. The heads 121 are urged toward the holders by a spring 129 coiled about the shaft 122 within the sleeve 124 confined between the block 124 and the bushing 128, and urged in the opposite direction by a spring 130 coiled on the portion of the shaft projecting from the bushing 128 between said bushing and a collar 131 fixed on the shaft. To move the ejectors toward and away from the holders a roller 132 carried on the under side of each of the slides 126 engages in a cam groove 133 in the horizontal disk portion of a sleeve 134 engaged upon and fixed to the upwardly extending sleeve portion of the turret head 50 engaged upon the conical portion 51' of the shaft 51. The cam groove 133 has a portion concentric to the shaft 51 relative to all of the positions of the holders with the exception of a holder position relative to the ejecting position and the cam at said position is arranged with an eccentric portion, as at 133'. As the cam rollers 132 travel relative to the concentric portion of the cam the ejector head 121 will be positioned to be yieldingly engaged by a container body in the holders and as the cam rollers travel relative to the eccentric portion of the cam at station G, the ejector head will be moved outwardly and thereby eject the container from the holder stationed relative thereto.

It will be obvious that various modifications may be made in the construction and arrangement of the parts of the apparatus for carrying out the invention without departing from the scope of the invention and that portions thereof may be used without others and come within the scope of the invention.

Having described my invention, I claim:

1. The method of making containers of fibrous material, which comprises providing a blank having a surface coating of a composition, shaping the blank to tubular form with the coating on the inside and marginal portions of the blank overlapping, securing the blank in tubular form at the overlapping portions with the coating composition, and then applying a coating of a composition to the seam portion formed by the overlapping portions inside the container body.

2. The method of making containers of fibrous material, which comprises providing a blank and a closure having a surface coating of a composition, shaping the blank to form a tubular body with the coating composition on the inside and the side marginal portions of the blank overlapping, securing the blank in tubular form at the overlapping portions with the coating composition, applying a coating of a composition in a viscous state to the side seam portion inside the body, flanging a closure and inserting the flanged closure in an end of the body, securing the closure in the body by rolling the closure flange and end portion of the body upon themselves and sealing the closure in the body with the coating composition.

3. The method of making containers of fibrous material, which comprises providing a blank and a closure having a surface coating of a composition, shaping the blank to form a tubular body with the coating on the inside and the side marginal portions of the blank overlapping, securing the blank in tubular form at the overlapping marginal portions with the coating composition, applying a coating of a composition in a viscous state to the side seam portion inside the container and about the inner surface adjacent one end of the body, and inserting a flanged closure in the end of the body and forming the viscous coating material applied adjacent the end of the body as a fillet at the juncture of the closure with the body and sealing the closure in the body by said coating material.

4. The method of making containers of fibrous material, which comprises providing a blank and a closure having a surface coating of thermoplastic material, shaping the blank to form a tubular body with the coating on the inside and the side marginal portions of the blank overlapping, securing the blank in tubular form at the overlapping marginal portions with the coating material by the application of heat and pressure, applying a coating of thermoplastic material in a viscous state to the seam portion inside the container and about the inner surface and adjacent one end of the body, flanging a closure and inserting the flanged closure in the end of the body with the viscous coating material and forming the surface coating material as a fillet at the juncture of the closure and the body, securing the closure in the body by interlocking the end portion of the body and closure flange, and sealing the closure in the body with the coating material on the interlocked closure flange and body portion by the application of heat and pressure.

5. In an apparatus for making containers of the character specified, a mandrel conforming to the shape of the container body, means to shape a blank having a surface coating of thermoplastic material about the mandrel to form a tubular body with the coated surface on the inside and the side marginal portions of the blank overlapping on the mandrel, means to subject the overlapping marginal portions of the blank to heat and pressure to secure the blank at the overlapped marginal portions with the coating material, means to eject the formed tubular body from the mandrel, and means engaged by and operative by the body as it is ejected from the mandrel to apply a film of coating composition in a viscous state longitudinally over the seam formed by and the raw edge of the overlapped portion inside the body.

6. In apparatus for making containers of the character specified, a mandrel conforming to the shape of the container body, means to shape a blank having a surface coating of thermoplastic material about the mandrel to form a tubular body with the coating material on the inside and the side marginal portions of the blank overlapping on the mandrel, means to subject the overlapping marginal portions of the blank to heat and pressure to secure the same with the coating material, means to eject the tubular body from the mandrel, means disposed at one end of the mandrel to apply a coating of thermoplastic material in a viscous state to the seam formed by and the edge of the overlapped marginal portions inside the body when the body is ejected from the mandrel, and means to guide and cause the seam formed by and the edge of the overlapped portion inside the body to move relative to said coating applying means as the body is moved from the mandrel.

7. Apparatus for making containers as claimed in claim 6, wherein the means to apply the composition coating to the seam and an edge of the overlapped marginal portions inside the body, comprises a trough containing the composition disposed at the end of the mandrel, a wheel rotatable in and a peripheral portion projecting from the trough with which said seam portion of the body is caused to engage by the guiding means and the body as it is ejected from the mandrel rotate the wheel to transfer the composition from the trough to the seam portion thereof.

8. In apparatus for making containers of fibrous material, a mandrel, means to shape a blank having a surface coating of thermoplastic material about the mandrel to form a tubular body with the coating on the inside and the marginal portions of the blank overlapping on the mandrel, means to apply heat and pressure to the overlapped portions of the blank to secure the same with the coating material, means to eject the body from the mandrel, means disposed relative to the end of the mandrel to apply coating material in a viscous state to the seam formed by and an edge of the overlapping marginal portions inside the body as it is ejected from the mandrel, and a pump device adapted for connection with a supply of the coating material operative to supply the coating material to the means to apply the coating material to the seam on the inside of the body.

9. Apparatus for making containers as claimed in claim 8, wherein the pump device comprises a body arranged with a chamber and a normally closed valve controlled inlet and outlet to retain material within the chamber, and means operative to exert pressure on the material in the pump chamber to actuate the outlet controlled valve and discharge the material from the chamber and open the inlet to draw material at the outlet into the chamber.

10. Apparatus for making containers as claimed in claim 8, wherein the pump device comprises a body arranged with a chamber having an outlet and an inlet, valves to control the inlet and outlet and normally urge to closing position and shutting off the pump chamber from the atmosphere, a hollow contractile and expansible member in communication with the chamber in the body, and said member and the body chamber normally containing the material therein, and said member operative by the contraction thereof to exert pressure on the material in the chamber to actuate the outlet valve to open the outlet and discharge the material from the chamber and by the expanding movement thereof actuate the inlet valve to open the inlet and draw material at the outlet into the chamber.

11. In apparatus for making containers as claimed in claim 5, a hollow holder supported to revolve in a horizontal path in the plane of the mandrel adapted to receive a body ejected from the mandrel, and means relative to which the holder is adapted to be positioned with a body therein operative to apply thermoplastic material in a viscous state about the inner surface adjacent an end of the body.

12. In apparatus for making containers as claimed in claim 5, a hollow holder, a carrier for said holder intermittently operative to move the holder in a horizontal path in the plane of the mandrel and adapted in one position thereof to be alined with and receive therein a body ejected from the mandrel, and means in another position of the holder operative to apply thermoplastic material in a viscous state about the inner surface adjacent an end of the body in the holder.

13. In apparatus for making containers as claimed in claim 5, a hollow holder, a carrier for said holder intermittently operative to move the holder in a horizontal path in the plane of the mandrel and adapted in one position thereof to be alined with and receive therein a body ejected from the mandrel, and means in another position of the holder operative to apply thermoplastic material in a viscous state about the inner surface adjacent an end of the body, comprising a trough containing the thermoplastic material, a wheel rotatable in the trough with a peripheral portion projecting therefrom, a carrier for the trough, and means to actuate said carrier to engage the trough in predetermined position in the body in the holder and engage the wheel with the inner surface of the body and revolve the trough with the wheel in said position about the inside of the body, and then actuate the trough to move the wheel out of engagement with the body and the trough out of the body.

14. In apparatus for making fibrous containers, a mandrel having juxtaposed flat surfaces extending longitudinally thereof and arranged in different planes, means to shape a blank having a surface coating of thermoplastic material about the mandrel to form a tubular body with the coating material on the inside and overlap the side marginal portions of the blank relative to a flat surface of the mandrel, and means to engage the overlapped portions of the blank on the mandrel and arranged to longitudinally score the material of the body relative to and offset one of the overlapping portions and subject the overlapping portions to heat and pressure to secure the same with the coating material.

15. Apparatus for making fibrous containers as claimed in claim 14, wherein the means to score the material of the body and offset an overlapping portion thereof and subject the overlapping portions to heat and pressure to secure the same with the coating material, comprises a head movable toward and away from the mandrel having flat surfaces complemental to the flat surfaces on the mandrel, and means to heat the head.

16. Apparatus for making containers, a mandrel, means to shape a blank about the mandrel with side marginal portions at which the blank is to be secured overlapping on the mandrel, and a head movable into and out of engagement with the overlapping portion of the blank on the mandrel, said mandrel and head having opposed faces relative to which the marginal portions of the blank are overlapped adapted to co-operate by the engagement of the head with the mandrel to longitudinally score the blank within an overlapped portion and laterally offset said overlapping portion relative to the body of the blank.

17. Apparatus for making containers of fibrous material, a mandrel having juxtaposed flat faces arranged in different planes, means to shape a blank having a surface coating of thermoplastic material about the mandrel with the coating on the inside and the side marginal portions overlapping relative to the flat surfaces of the mandrel, a head movable into and out of engagement with the mandrel, said head having flat faces complemental to the flat faces on the mandrel and adapted to co-operate with said faces when brought into engagement with the overlapped marginal portions of the blank thereon to longitudinally score the material of the blank relative to and offset laterally one of the overlapping portions and subject the overlapping portions to heat and pressure to secure the same by the coating material.

18. Apparatus for making containers as claimed in claim 17, wherein one of the flat faces on the mandrel is longitudinally fluted and the offsetting of a marginal portion of the blank by the engagement of the head with the mandrel co-operating with said fluted face to hold the overlapping marginal portions against lateral movement on the mandrel.

19. In apparatus for making containers, a holder for a container body, means to apply thermoplastic material in a viscous state about the inner surface adjacent an end of a container body supported by the holder, comprising a trough carrying the thermoplastic material, a wheel rotatably carried within the trough with a peripheral portion of the wheel projecting from the trough, a reciprocatory and rotary carrier for said trough arranged in opposed relation to the holder, and means to actuate said carrier to position the trough in predetermined position within a container body supported by the holder, engage the wheel with the inside of the container, rotate the carrier in said position about the container body and then move the carrier with the trough out of the container body.

20. In apparatus for making containers, a holder for a container body, a trough carrying a coating composition in a viscous state, a wheel rotatably carried in the trough with a peripheral portion projecting from the trough, a carrier for said trough, a head supported in opposed relation to the holder to have rotary movement and reciprocatory toward and away from the holder, means to mount the trough carrier on said head to participate in the rotary and reciprocatory movements thereof and have independent movement on an axis transversely of the head, means to reciprocate the head to position the trough within a container body supported by the holder and out of said container body, means to retain the trough carrier in predetermined position relative to the head in position away from the holder and permit the carrier to assume a position laterally of the head to engage the wheel with the inside of the container body where the head with the trough carrier is positioned within the container body supported by the holder, and means operative in said latter position of the head and trough carrier to rotate the head and revolve the trough carrier about the inside of the container body with the wheel in engagement therewith and the wheel operative to transfer the composition from the trough and apply the composition in a band to the surface of the container.

21. In container making apparatus, a mandrel, means to shape a blank having a surface coating of thermoplastic composition about the mandrel with the coating on the inside and the marginal portions of the blank overlapping to form a tubular container body, means movable toward and away from the mandrel to apply heat and pressure to and secure the blank at the overlapped marginal portions with the coating composition, an intermittently rotatable turret carrying a series of radially extending and equidistantly spaced holders for container bodies adapted to be revolved in a plane coincident with the mandrel by the rotation of the turret and station the holders succesively in line with the mandrel, means to eject the container body from the mandrel into a holder, and means operative to apply a coating of thermoplastice composition to the seam on the inside of the container formed by the overlapped portions as the container body is ejected from the mandrel.

22. In container making apparatus as claimed in claim 21, means in communication with a source of the coating composition operative from the means movable toward and away from the mandrel to supply coating composition to the means to apply the composition to the seam on the inside of the container.

23. In container making apparatus as claimed in claim 21, means relative to which a container body in a holder is successively stationed to apply a coating of thermoplastic composition about the inside and adjacent an end of the container body.

24. In container making apparatus as claimed in claim 21, means relative to which a holder with a container body is successively stationed to apply a coating of thermoplastic composition about the inside and adjacent an end of the container body, and means in communication with a source of the coating composition operative from the means movable toward and away from the mandrel to supply the coating composition to the means to apply said composition to the inside of the body at the seam and about the inside and adjacent an end thereof.

25. In container making apparatus as claimed in claim 21, means relative to which a holder with a container body is successively stationed operative to apply a coating of thermoplastic composition about the inside and adjacent an end of the body, and means in communication with a source of the coating composition rendered active by a container body in a holder stationed relative to the means to apply the coating composition about the inside adjacent an end thereof and operative by the means movable toward and away from the mandrel to supply the coating composition to said means to apply the coating composition to the inside of the container body at the seam and adjacent an end thereof.

26. In container making apparatus as claimed in claim 21, means relative to which a holder with a container body is successively stationed operative to apply a coating of thermoplastic composition about the inside and adjacent an end of the container body, and means relative to which a container body in a holder is stationed successively to the means to apply the composition about the inside and adjacent an end of the container body operative to insert a peripherally flanged closure having a surface coating of thermopastic material into said end of the container body, the closure as it is inserted into the container body crowding surplus coating composition forwardly of the closure and forming a sealing fillet at the juncture of the closure with the body, and means to apply heat and pressure to the closure flange and end of the container body to secure the closure in the container body with the coating material.

27. In container making apparatus as claimed in claim 21, means relative to which a holder with a container body is successively stationed operative to apply a coating of composition in a viscous state about the inside and adjacent an end of the body, means relative to which a container body in a holder is successively stationed to insert a peripherally flanged closure disk into the end of the container body with the viscous composition coating, the disk as it is engaged in the body crowding the composition applied about the inside of the body forwardly of the disk and forming a sealing fillet at the juncture of the closure with the body, and means to which the holder with the body having a closure disk inserted therein is successively stationed to interlock the closure flange with the end of the container body and apply heat and pressure to the interlocked portions to seal the closure in the body with the coating composition.

28. In means for applying a closure in an end of a container body having a thermoplastic composition coating on the inside, a tubular holder for the container body, means relative to which the holder with the container body therein is positioned operative to apply a coating of thermoplastic composition in a viscous state about the inside and adjacent an end of the container body, and means to insert a peripherally flanged disk having a surface coating of thermoplastic composition into the end of the body to which the viscous thermoplastic composition is applied, the closure having a dimension relative to the body whereby as it is inserted into the container body crowding the applied thermoplastic composition forwardly thereof and cause it to form a sealing fillet of said coating composition at the juncture of the closure with the body, means to interlock the closure flange with the end portion of the body, and means to apply heat and pressure to the interlocked portions of the closure and body and seal the closure in the body with the coating composition.

29. The method of making containers of fibrous material, which comprises providing a blank having a coating of thermoplastic composition on the margin of one side, shaping the blank to form a tubular body with the marginal portion having the thermoplastic composition coating overlapping the opposite side margin portion of the blank and securing the blank at the overlapping marginal portions with the thermoplastic composition by the application of heat and pressure, applying a coating of thermoplastic composition on the inside and adjacent an end of the tubular body, inserting a flanged closure in said end of the body with the thermoplastic composition applied thereto, securing the closure in the body, and then sealing the closure in the body with the thermoplastic composition by the application of heat and pressure.

30. The method of making containers of fibrous material, which comprises providing a blank, applying a coating of thermoplastic composition to the surface of a side marginal portion thereof, shaping the blank to form a tubular body with the thermoplastic composition coating on said marginal portion overlapping the opposite side marginal portion of the blank and securing the blank at the overlapped marginal portions with the thermoplastic composition by the application of heat and pressure, applying a coating of thermoplastic composition in a viscous state to the inner surface adjacent an end of the body, inserting a flanged closure in said end of the body with the thermoplastic composition applied thereto and thereby causing part of the thermoplastic composition to be crowded forwardly of the closure and form a sealing fillet at the juncture of the closure and body, securing the closure in the body by interlocking the closure flange with the end portion of the body, and sealing the closure in the body with the thermoplastic composition by the application of heat and pressure to the interlocked portion of the body and closure flange.

31. In apparatus for making fibrous containers, a mandrel, means to shape a blank having a composition coating on a surface thereof about the mandrel to form a tubular body with the coating on the inside and overlapped at the side marginal portions of the blank, and means to subject the overlapped marginal portions of the blank to heat and pressure to secure the same with the coating composition, and said means and the mandrel arranged to longitudinally score the material of the blank relative to and offset one of the overlapped portions.

32. In container making means as claimed in claim 31, means relative to which a holder with a container therein is successively stationed operative to apply a coating of composition in a viscous state about the inside and adjacent an end of the body, and means relative to which the body in a holder is successively stationed operative to insert a peripherally flanged disk into the end of the body to which the viscous composition coating is applied, and said disk as it is inserted into the body crowding surplus coating composition forwardly of the disk and forming it to a sealing fillet at the juncture of the disk with the body and the composition sealing the disk in the body.

33. In apparatus for making containers of fibrous material, a mandrel, means to shape a blank having a composition coating on a surface thereof about the mandrel to form a tubular body with the coating on the inside and the marginal portions of the blank overlapped on the mandrel, means to apply heat and pressure to the overlapped portions of the blank to secure the same with the coating composition, means to eject the body from the mandrel, means disposed relative to the mandrel to apply a coating of composition in a viscous state to the seam formed by and to the edge of the overlapped marginal portions inside the body as the body is ejected from the mandrel, a pump adapted for connection with a source of coating composition, means to actuate the pump to deliver the coating composition to the means to apply the composition to the seam on the inside of the body, and means to control the operation of said pump actuating means and actuation of the pump to deliver a predetermined quantity of the composition to said composition applying means.

34. In apparatus for making containers of fibrous material, means to shape a blank having a composition coating on a surface thereof to tubular body form with the side marginal portions overlapping and securing the blank at said overlapped marginal portions with the coating composition, means to apply a coating of composition in a viscous state longitudinally of the body over the edge of the overlapped portion within the body, means to apply a band of composition in a viscous state about the inner surface adjacent an end of the body, and means to supply composition in predetermined quantity to said means to apply the composition to the edge of the overlapped portion of the blank and about the inner surface of the body.

35. In apparatus for making containers of fibrous material, means for shaping a blank having a composition coating on the surface thereof to form a container body and securing the seam with the coating composition, means to apply a coating of composition in a viscous state to the body seam within the body and about the inside adjacent an end of the body, pump means having inlet means adapted for connection to a source of the composition and outlet means to deliver the composition to the means to supply the composition to the seam and about the inner side of the body, means operative alternately with said means to apply the composition to the seam and inner side of the body to actuate said pump means, and means to control the operation of the pump actuating means to regulate and deliver the composition in predetermined quantity to the means to apply the composition to the seam and inner side of the body, and the pump means operative after delivery of composition thereby to draw composition at the outlet means within and retain it in the outlet means.

36. In apparatus for making fibrous containers, a mandrel, means to wrap a blank having a composition coating on the surface thereof about the mandrel with the side marginal portions overlapped to form a tubular body with the coating composition on the inside, means movable toward and away from the mandrel to subject the overlapped marginal portions to heat and pressure to secure the same with the composition, a series of holders supported to revolve in a horizontal plane coincident with the mandrel, means to intermittently rotate the support with the holders to successively position the holders in alinement with the mandrel, means to eject a body from the mandrel into a holder, means including a trough to contain a composition in a viscous state ond a wheel rotatably carried by the trough with a peripheral portion projecting therefrom adapted to be engaged and rotated by the body as it is ejected from the mandrel and transfer composition from the trough and apply it to the overlapped portion inside the body, means including a trough containing composition in a viscous state and a wheel rotatably carried thereby with a peripheral portion projecting from the trough and relative to which the holders are successively positioned from the mandrel operative to engage the wheel with and revolve it about the inside of the body in the holder to transfer composition from the trough and apply it in a band about the inside of the body, pump mechanism mounted on the means to subject the overlapped marginal portion on the blank to heat and pressure having inlets adapted to be connected with a source of the composition and having outlets with tubes connected thereto one leading to each trough, means operative to actuate the pump mechanism by the movement of the heat and pressure applying means toward the mandrel, and adjustable means to control the operation of the actuating means for and the pump mechanism to deliver composition in regulated quantity to the troughs.

OGDEN JOHNSON.